UNITED STATES PATENT OFFICE.

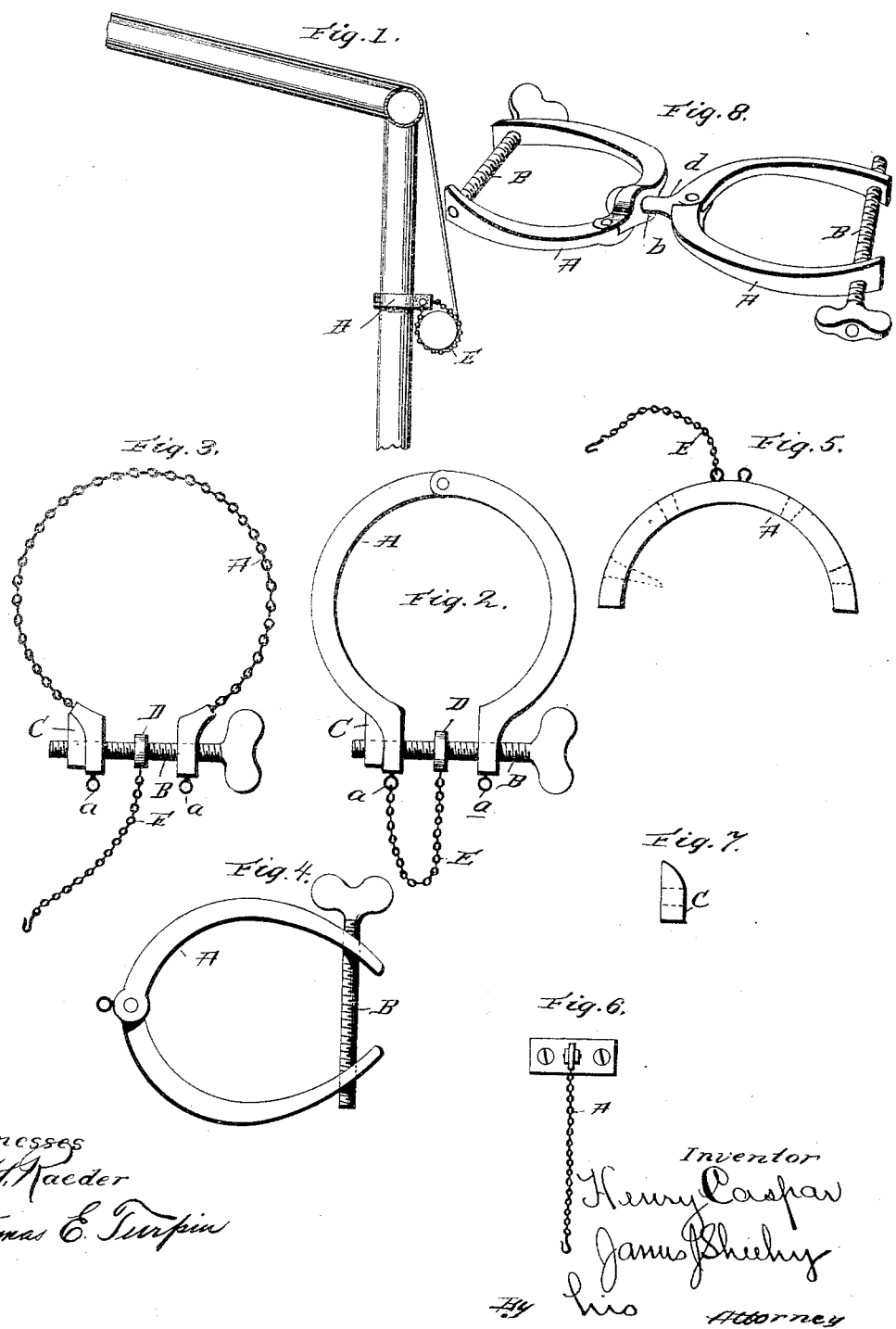

HENRY CASPAR, OF NEW ORLEANS, LOUISIANA.

CLASP FOR AWNING-POLES.

SPECIFICATION forming part of Letters Patent No. 461,069, dated October 13, 1891.

Application filed November 4, 1890. Serial No. 370,313. (No model.)

*To all whom it may concern:*

Be it known that I, HENRY CASPAR, a citizen of the United States, residing at New Orleans, in the parish of Orleans and State of Louisiana, have invented certain new and useful Improvements in Clasps for Awning-Poles; and I do declare the following to be a full, clear, and exact description of the invention, such as will enable others skilled in the art to which it appertains to make and use the same.

My invention has relation to improvements in awning attachments; and it has for its object, among other things, to provide a cheap, simple, and readily-adjustable device for supporting an awning-pole, whereby the weight of the same is taken off the awning-canvas, and the pole is fastened to the posts of the frame, thus obviating any damage to the awning resulting from the strain in suspending the pole.

Other objects and advantages will appear from the following description and claims, when taken in connection with the accompanying drawings, in which—

Figure 1 is a side elevation of an awning-frame and awning, my improved device being illustrated in an operative position. Fig. 2 is a top plan view of my improved clamp and pole-supporting chain. Fig. 3 is a plan view of a modified construction of the same. Fig. 4 is a plan view of another modification. Fig. 5 is a plan view of a construction designed to be employed upon wooden posts. Fig. 6 is another construction designed for use upon wooden posts, and Fig. 7 is a side view of the binding-nut for fixing one of the branches of the clamp upon the binding-screw. Fig. 8 is a perspective view of another modification.

Referring by letter to the said drawings, A indicates the curved hinged branches of the clamps, which have their free ends turned out parallel with each other, as illustrated.

B indicates the binding-screw for fixing the clamping branches upon the post. This binding-screw B, which is provided with a winged handle portion, as illustrated, takes through apertures formed in the parallel straight portions of the hinged branches, one of said apertures being threaded to receive the threads of the screw and the other left smooth to allow the screw to pass freely through the same. The branch of the clamp having the smooth-bore aperture is adjusted and fixed upon the screw B by a binding-nut C, which has one of its sides beveled to correspond with the side of the branch against which it bears. By the employment of this nut C it will be seen that I am enabled to quickly and readily adjust the clamping branch upon the post, when the binding-nut is turned to place and the screw tightened to thoroughly secure the clamp.

Formed integral with or suitably attached to the ends of the clamp-arms are eyes *a*, which are designed and adapted to receive the end of the loop-supporting chain after it has been passed around the awning-pole. One end of this chain E, which is provided at its free end with a hook or similar device, is fastened to a disk-shaped nut D, which occupies an intermediate position upon the binding-screw between the two clamping arms or branches; but it is obvious that if desired this intermediate nut D might be dispensed with and one end of the chain E secured to the end of one of the clamping branches, when it may be secured by its hook to the eye upon the end of the other branch after being passed around the awning-pole.

In Fig. 3 of the drawings I have illustrated a construction substantially the same as that in Fig. 2, the difference being that I employ a chain to perform the function of the clamping branches, and it will be observed that I employ the same construction to bind the chain upon the post.

In Fig. 4 of the drawings I have illustrated a construction of clamp consisting of two curved hinged branches provided adjacent to their free ends with apertures which are screw-threaded in opposite directions, whereby when the binding-screw is turned it will serve to move the respective branches in opposite directions, and in some cases this construction, which possesses the advantage of simplicity, is preferable.

The construction which I have illustrated in Fig. 5 is designed and adapted for use upon wooden posts, and it consists of a semicircular-shaped plate having screw-apertures through its periphery to receive screws which take into the post and secure the plate thereto, and Fig. 6 of the drawings also illustrates a construction applicable to wooden posts; but this construction, which consists of a flat plate having screw-apertures, is designed to be employed upon rectangular posts.

These constructions of clamps illustrated in Figs. 4, 5, and 6, respectively, are provided with suitable eyes upon their faces, to one of which the supporting-chain is secured and is adapted to hook into the other after being passed around the awning-pole.

By the employment of a means for securing the awning-pole to the upright posts of the frame it will be seen that the weight of the pole is taken off the canvas, and it will also be seen that, the pole being secured, the awning will be prevented from being blown by the wind and torn.

By special reference to Fig. 8 it will be seen that I dispense with the chains and employ two rigid clamps. These clamps are connected to each other by a swivel-joint or such a joint as will allow the loops or clamps to be turned in a plane at right angles to each other. This connection may be made by providing a hole $b$ in one branch of one of the clamps and extending one end of one of the branches of the other clamp, as shown at $d$, and passing it loosely through said hole. The portion $b$ which extends beyond the hinge or pivotal point after being passed through the eye of the opposite clamp may be headed so as to prevent casual drawing out of the same or the separation of the parts.

Having described my invention, what I claim is—

1. A clamp having its ends adapted to receive a binding-screw and means for the attachment of a chain, in combination with a screw and a nut or ring thereon, also adapted to receive one end of the chain, substantially as specified.

2. A device for attaching the canvas-pole of an awning to one of the upright posts of an awning-frame, comprising a plate or clamp adapted to be secured to said pole and carrying two eyes for the attachment of a chain, and a chain secured at one end in one of the eyes and adapted to be secured at its opposite end in the other eye and embrace the awning-post, substantially as specified.

In testimony whereof I affix my signature in presence of two witnesses.

HENRY CASPAR.

Witnesses:
EVARISTE MOÏSE,
PETER THELEN.